Figure 1:
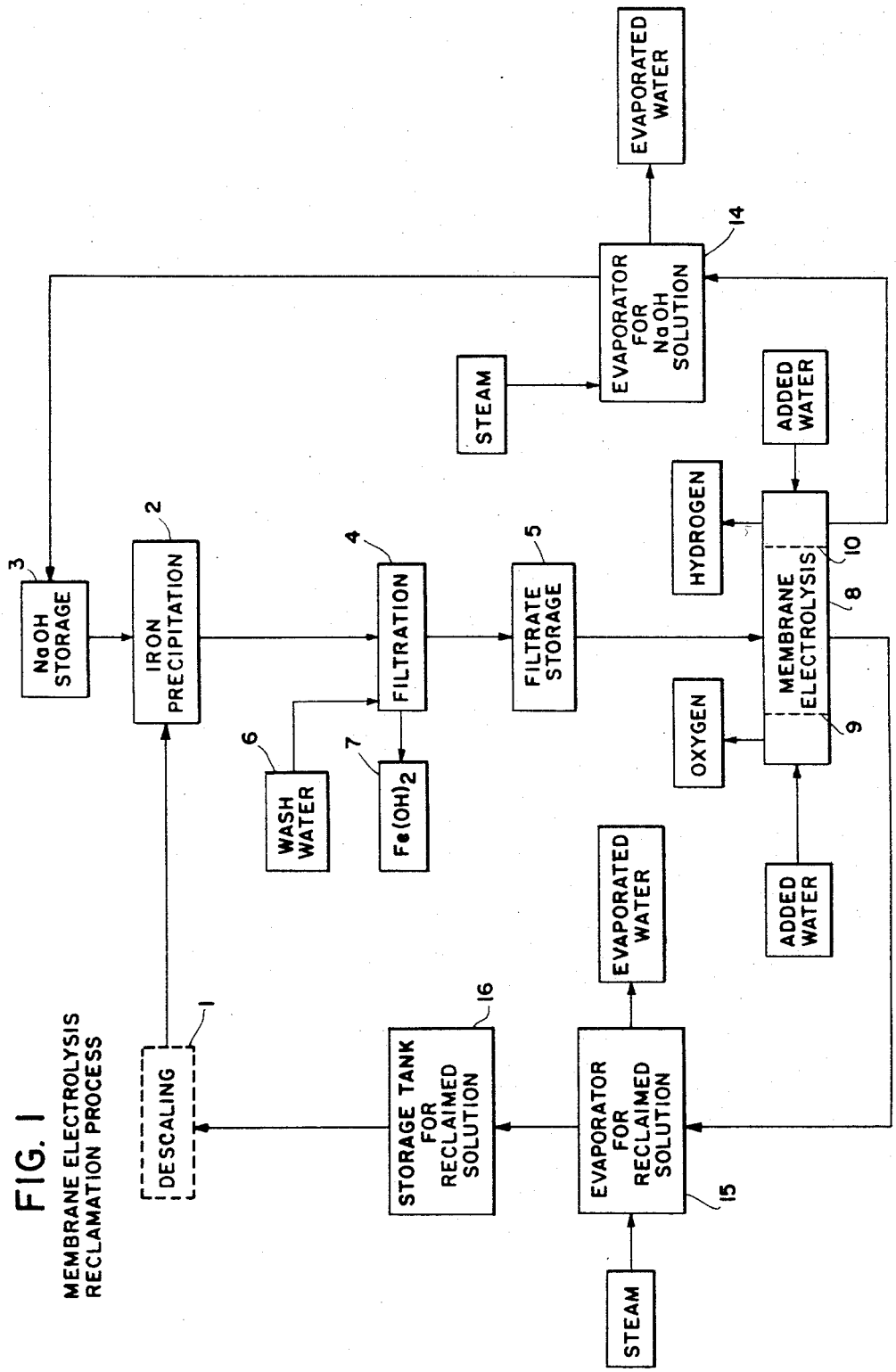

THREE CHAMBER MEMBRANE ELECTROLYSIS

TWO CHAMBER MEMBRANE ELECTROLYSIS

United States Patent Office 3,411,998
Patented Nov. 19, 1968

3,411,998
PROCESS FOR RECLAIMING SPENT ALKALI
METAL CARBOXYLATE SOLUTIONS
Harold Wallman, New London, Thomas V. Bolles, Mystic, and Oliver L. I. Brown, Quaker Hill, Conn., assignors to General Dynamics Corporation, New York, N.Y., a corporation of Delaware
Filed Apr. 6, 1966, Ser. No. 540,660
18 Claims. (Cl. 204—98)

The present invention relates to an improved process for recovering alkali metal carboxylate acid salt (alkali metal carboxylates) and alkali metal hydroxide from spent or partially spent cleaning, descaling or pickling solutions and reconstituting such solutions to a desired pH for reuse. Aqueous alkali metal carboxylate solutions of a desired pH are useful for removing scale, film or other contaminations from surfaces of products made of steel, of stainless steel, or of other alloy steel, or of many other kinds of metal. Such scale or film usually includes oxides of the metal and alloying metals of which the surface is composed. Often it may include contaminating film or scale of other metal compounds formed on the surface to be cleaned during manufacture or use of the product.

Aqueous sodium citrate solution of appropriate acidity is a typical example of such alkali metal carboxylate solutions which, at a desired pH, are effective for complexing the metal atoms of the compounds to be removed without substantial loss of underlying surface metal. Optimum acidity for a sodium citrate solution is usually about 3.5 to 4.5, although pH's from 1 to 7 may be used. Solutions more acid than the optimum pH tend to cause loss of surface metal, and solutions more basic than the optimum tend to be less efficient. When the pH of such a solution is raised as high as 9, metal complexed at a lower pH may start to precipitate, and will rapidly and completely precipitate when the pH is raised to about 12 to 14.

In the manufacture of steel, sodium citrate pickling solutions of about pH 4 are very effective for continuous treating of rolled strips and sheets of steel, stainless steel or similar iron alloys, which are passed continuously through a tank of the solution to remove surface oxide scale or film formed during the manufacturing process. Such an operation requires large quantities of the pickling solution. Since the pickling solution loses efficiency as its complexed-metal content increases, efficient operation requires that fresh pickling solution be supplied to replace solution which has become spent, in the sense of having complexed enough metal to reduce its efficiency below that considered suitable for the particular descaling or surface cleaning operation, even if it still retains some capacity for complexing more metal. Citric acid is a relatively expensive acid, so an economically efficient recovery process for the spent pickling solution if of great practical importance, particularly when the solution is used in large operations needing frequent renewal of the pickling solution to maintain suitable efficiency.

Various processes have heretofore been known for recovering citrates from spent pickling solution, and reconstituting the solution. The object of our invention is to provide an improved process which is more economical and efficient than any previously known recovery or reclaiming process. Among its advantages are the following:

(1) It is relatively inexpensive to install and operate.

(2) It can be used either batchwise or in a closed cycle with a descaling operation.

(3) It recovers nearly all of the sodium citrate solution in the spent solution and also nearly all of the additional sodium hydroxide used in practicing our improved process.

(4) It needs no large supplies of other chemicals to practice our improved process. When the three-compartment electrolytic cell is used in the process as hereinafter described, sulfuric acid solution is used as the electrolyte in the anode compartment of the cell. Small amounts of sulfuric acid may need to be added from time to time to make up for leakage losses. Some small amounts of citric acid and sodium hydroxide are lost in the operation by adhering to the separated solids even after they have been washed as hereinafter described. But water is the only ingredient that has to be replaced in substantial amounts in carrying out our improved reclaiming process.

(5) Our improved process avoids any waste disposal problem. The separated solids can be disposed of as ore for use in steel manufacture. The oxygen and hydrogen and evaporated water generated in practicing our process can be discharged into the atmosphere without objectionable air pollution. When the operation is on a large enough scale to make it worthwhile, the oxygen and hydrogen can be collected and used or sold.

The foregoing advantages and others will be obvious to those skilled in the art from the following description of our improved process.

Figure 2:
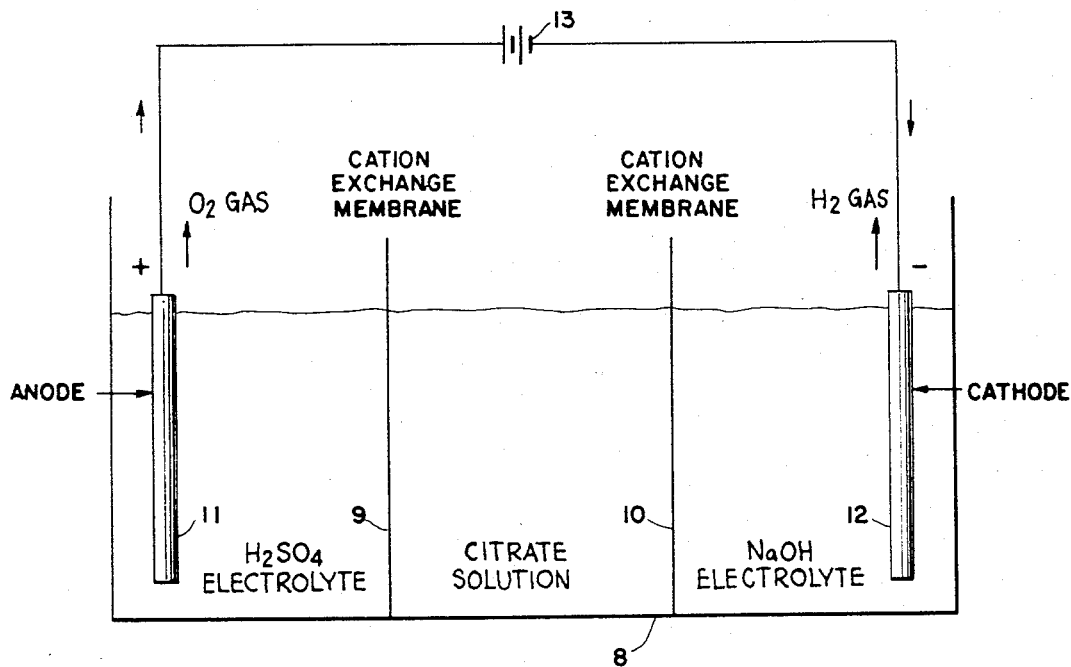
Figure 3:
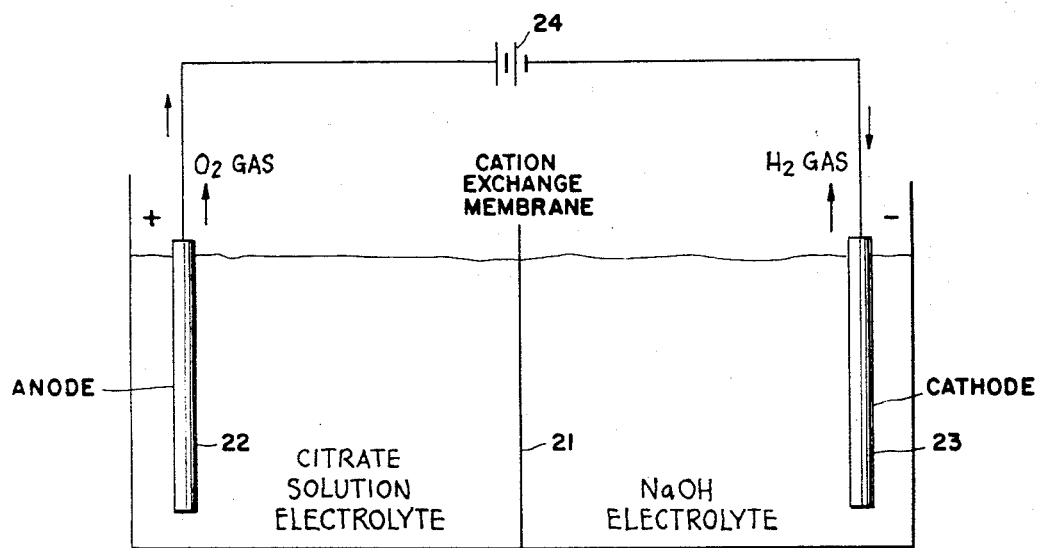

FIG. 1 is a diagrammatic flow sheet illustrative of our process. FIGS. 2 and 3 are respectively diagrammatic illustrations of a three-compartment and of a two-compartment type of electrolytic cell which can be used for carrying out our electrolytic step in our improved process.

Referring first to the flow sheet FIG. 1, the tank 1 is a tank in which the cleaning and descaling operation is carried out. Spent solution from descaling tank 1 is run or pumped to a precipitating tank 2, where enough aqueous sodium hydroxide solution from a storage tank 3 is added to the spent solution into the precipitating tank 2 to raise the pH to about 12 to 14. This pH increase causes rapid and complete precipitation of the iron hydroxide (and associated metallic hydroxides, if any) from the solution in tank 2. The contents of tank 2 are then transferred to a solids separating device 4, such as a filter or centrifuge. The filtrate or separated liquid is fed to filtrate storage tank 5. The solids remaining in device 4 are then washed with water from a suitable water source 6, and the wash water in turn is separated from the solids by filtration or centrifuging and added to the filtrate in storage tank 5, to minimize the loss of citric acid and/or sodium hydroxide by adhesion to the separated solids. The separated solids are then transferred to a storage bin or dump 7. The separated solids are mostly iron hydroxides. When alloy steels have been treated, they may include some other metallic hydroxides (e.g., those of chromium and/or nickel). When sufficient solid metallic hydroxides have been accumulated in the solids bin or dump 7, they may be disposed of, for example, as ore for use in steel manufacture.

The liquid from the filtrate storage tank 5 is run or pumped to an electrolytic cell, which is advantageously the three-compartment type diagrammatically shown in FIG. 2, but may alternatively be of the two-compartment type diagrammatically shown in FIG. 3.

Referring first to the three-compartment cell 8 shown in FIG. 2, it consists of three chambers separated by two cation exchange membranes 9 and 10 inserted between an anode 11 and a cathode 12. The membranes 9 and 10 are provided with suitable supports and spacers arranged to form three chambers of sufficient size to hold conveniently each of the three solutions used in the operation of the cell and to allow for the piping connections needed to supply and/or withdraw solution from each chamber, in whole or in part, during the operation as herein described. Suitable cation exchange membranes are commercial products available on the market and known to those skilled in the art. For example, suitable cation exchange membranes designated Cation Type 61AZL183, Cation Type 61CZL183, Cation Type 61AZL066, Cation Type 61ACG067, Cation Type 61AZL065, Cation Type CR–70 and Cation Type 61AZPGP–067, and suitable cation exchange membranes designated C–60, C–100, C–103, C–300 and C–310 are marketed.

The anode 11 is shown in the left-hand chamber of FIG. 2. The electrolyte used in this anode compartment is preferably an aqueous sulfuric acid solution, which functions merely as an electrolyte to carry the DC current through the anode compartment in the operation of the cell. It is not consumed in the operation. The anode 11 may be made of platinized titanium, lead or lead alloy, or any other conducting metal which is not attacked by the electrolyte in the anode chamber. This electrolyte is hereinafter called the anolyte.

The cathode 12 is shown in the right-hand chamber of FIG. 2. The electrolyte used in the cathode chamber, hereinafter referred to as the catholyte, is a sodium hydroxide solution. The cathode 12 may be made of Monel metal or any other metal not attacked by the catholyte. The central compartment of the cell 8 is filled with sodium citrate solution from the filtrate storage tank 5 which is continuously recirculated through the central compartment. This filtrate is an aqueous solution of $Na_3$ cit.* with some slight excess of NaOH. In a commercial plant for utilizing our process on a large scale, a stack of three-chamber cells of the kind above described may be used. The stack may consist of a number of such cells assembled side by side and held together by suitable mechanical means such as end plates and/or tie rods. The number of cells in such a stack can vary from two to several hundred, according to the size of the plant operation. If the number of cells is not too great, the individual cells may be conveniently connected electrically in series. If the number of cells is too large for efficient electrical supply by a series connection, the individual cells or smaller groups of series connected cells can be electrically connected in parallel to electrical bus bars suitable for supplying each cell with electric current at about the same voltage. The pipe connections for supplying and withdrawing liquid from the respective cell chambers are arranged in parallel so that liquid may be independently supplied to or withdrawn from all the anode chambers, or all the central chambers, or all the cathode chambers, in the stack.

For operating the cell, a DC current is supplied from any suitable source of DC electric power 13. The optimum current density varies, of course, with the size of the particular installation and the amount of liquid to be treated per day.

In a pilot plant system built to treat 10 gallons per day of spent sodium citrate solution, a three-chamber electrolytic cell above described and diagrammatically illustrated in FIG. 2 was operated very successfully at various constant DC current levels ranging from 10 to 30 amperes, which was equivalent to current densities through the cell ranging from approximately 40 to 120 amperes per square foot. The voltages required to maintain such currents ranged from 3.5 to 6.5 volts. In these runs each of the three solutions was maintained at a temperature of about 130° F. by conventional cooling means located outside the cell.

While the cell temperature is not critical, and may be allowed to vary widely, conventional heating and cooling means for the entire cell or stack of cells can be provided if desired, so that the temperature can be adjusted to whatever temperature is most effective for the particular operation. In general, an increased temperature reduces the voltage required and increases the efficiency of operation. The use of high temperature is, however, limited to temperatures that will not damage any of the materials of construction used in the cell. Any temperature between about 60° F. and about 180° F. is usually satisfactory.

---
\* In equations given in this application the shorter expression "cit." is used to denote the citric acid radical in place of its longer chemical formula.

The chemical and electrochemical reactions taking place in the respective cell chambers during the operation of the cell are as follows.

In the anode chamber the sulfuric acid is ionized according to the following equation:

$$H_2SO_4 \rightleftharpoons 2H^+ + SO_4^{--}$$

These ions carry the current though the anode chamber. Also in the anode chamber some of the water is electrolyzed by the following reaction:

$$H_2O \rightarrow 2H^+ + \tfrac{1}{2}O_2 + 2e^-$$

The $O_2$ gas thus formed is released at the anode. It can be discharged into the atmosphere or may be collected for use, if desired. The positively charged $H^+$ ions pass through the cation exchange membrane 9 into the center chamber of the cell under the influence of the electric potential.

In the center chamber the total reaction is:

$$Na_3cit. + 2H^+ \rightarrow NaH_2cit. + 2Na^+$$

From the center chamber the positively charged $Na^+$ ions pass through the cation exchange membrane 10 into the cathode chamber under the influence of the electric potential, whereas nearly all, if not all, of the negatively charged cit. ions do not do so. Instead, they react with the positively charged $H^+$ ions entering from the anode chamber to form a sodium citrate solution of increased acidity, as noted in the last equation given above.

In the cathode chamber some of the water of the sodium hydroxide solution is electrolyzed according to the following equation:

$$2H_2O + 2e^- \rightarrow 2OH^- + H_2$$

The $OH^-$ ions react with the $Na^+$ ions entering from the center chamber to form more sodium hydroxide. The total reaction in the cathode chamber is given by the equation:

$$2H_2O + 2Na^+ + 2e^- \rightarrow 2NaOH + H_2$$

The hydrogen gas $H_2$ so formed escapes at the cathode, and may be discharged into the atmosphere or collected for use, if desired.

As the electrolysis proceeds, the acidity of the sodium citrate solution in the center chamber is continuously increased, while the quantity of sodium hydroxide in the cathode chamber is constantly increased. During the electrolysis, makeup water is added to the anode chamber as needed to replace the electrolyzed water. Makeup water is also added to the cathode chamber in quantity sufficient both to replace the electrolyzed water and to maintain an optimum concentration of sodium hyroxide in the catholyte.

Some of the sodium hydroxide solution in the cathode chamber is continuously bled off and fed to a FIG. 1. In the evaporator the solution bled from the cathode chamber is concentrated to about a 50% solution of sodium hydroxide, which is then fed to the storage tank 3 for use in precipitating iron oxides complexed in the solution fed from the descaling tank 1 to the precipitating tank 2. Since substantially all the sodium hydroxide contained in the descaling solution is retained as well as that added in our process, very little sodium hydroxide needs to be supplied for replacement in order to maintain both processes in operation.

When the acidity of the sodium citrate solution in the center chamber of the cell has been increased to about pH 4 (or the degree of acidity desired for descaling use), it is fed from the center chamber to an evaporator, shown at 15 in FIG. 1. There sufficient water is evaporated to give the thus recovered sodium citrate solution of pH 4 the concentration desired for use in the descaling tank. From the evaporator 15 the so reclaimed and reconstituted descaling solution is fed to the storage tank shown at 16 in FIG. 1. From storage tank 16 the descaling solution is fed to the descaling tank 1, as and whenever some is wanted for use in descaling.

Some fresh citric acid and sodium hydroxide can be added to the solution in storage tank 16 to make up for any losses of these ingredients that may occur. Furthermore, it is sometimes useful to keep a reserve supply in storage tank 16 so that part of it can be in use for descaling while another part is being reconstituted.

As noted above, the loss of sodium hydroxide is small because substantially all of it in the catholyte is returned through evaporator 15 to the storage tank 3 and used in the recovery cycle. For the same reason, if any citric acid should leak through the cation exchange membrane 10 into the catholyte, it too would be recycled through storage tank 3 and thus restored to the recovery cycle.

We will now refer to our process as practiced when a two-compartment electrolytic cell of the type diagrammatically shown in FIG. 3 is used for carrying out the electrolytic step in our process.

Referring to FIG. 3, the cell 20 is divided into two compartments by a transverse cation exchange membrane 21 provided with suitable supports and spacers. This membrane 21 is of the same type as the commercial cation exchange membranes previously described as suitable for use in the cell of FIG. 2. The left-hand chamber of FIG. 3 contains an anode 22, and the right-hand chamber contains a cathode 23. DC voltage and current for operating the cell are supplied from a source 24.

Our process steps are the same up to the point where the solution from the filtrate storage tank 5 is fed to the electrolytic cell, whether the three-compartment cell 8 of FIG. 2 or the two-compartment cell 20 of FIG. 3 be used. So this part of our description begins with what is done when the cell of FIG. 3 is substituted for that of FIG. 2.

In the case of the FIG. 3 type cell 20, the solution from the filtrate storage tank 5 is fed into the anode compartment of cell 20 and is used as the electrolyte in that compartment. The filtrate solution, as previously noted, is an aqueous solution of which Na$_3$cit. is the major ingredient and NaOH a relatively small minor ingredient. The Na$_3$cit. ionizes to form positive Na$^+$ ions and negative cit.$^{---}$ ions. The NaOH also ionizes to form Na$^+$ ions and OH$^-$ ions. The electrical potential causes many of the Na$^+$ ions to pass through the cation exchange membrane 21 into the catholyte, but most, if not all, of the negative cit.$^{---}$ ions do not, and some Na$^+$ ions react in the anolyte with citric acid to form NaH$_2$cit. The result in the anode chamber is indicated by the following equation:

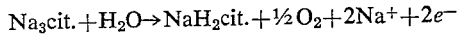
$$Na_3cit. + H_2O \rightarrow NaH_2cit. + \tfrac{1}{2}O_2 + 2Na^+ + 2e^-$$

The oxygen gas is released at the anode. This O$_2$ may be discharged into the atmosphere or collected, if wanted.

In the cathode chamber of cell 20 the electrolyte used is an aqueous solution of sodium hydroxide, just as in the case of the cathode chamber of cell 8 in FIG. 2, and also the same reactions take place during electrolysis in the catholyte of cell 20 as in the catholyte of cell 8. Positive H$^+$ ions formed from the electrolysis of water unite to form hydrogen gas H$_2$ which is released at the cathode, and negative OH$^-$ ions so supplied from the water unite with the entering Na$^+$ ions to form more NaOH according to the following equation:

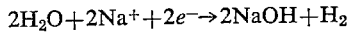
$$2H_2O + 2Na^+ + 2e^- \rightarrow 2NaOH + H_2$$

Furthermore, as in the case of cell 8 of FIG. 2, replacement water has to be added at the anode chamber and at the cathode chamber to make up for the water electrolyzed, and also enough additional water at the cathode chamber to maintain proper concentration of the NaOH electrolyte solution in the cathode chamber. Likewise, as in the case of cell 8, the pH of the sodium citrate is continually being reduced and the quantity of NaOH in the catholyte is continually being increased. Again, as in the case of cell 8, enough of the NaOH cathalyte solution in cell 20 is continuously bled off to maintain the quantity as well as the concentration of the catholyte substantially constant. Finally, as in the case of cell 8, the catholyte bled off from cell 20 is fed to an evaporator to obtain 50% NaOH solution for returning to the NaOH storage tank 3 of FIG. 1 and recycling in the process.

When the acidity of the sodium citrate solution in the anode chamber of cell 20 has been changed to about pH 4 (or whatever higher or lower pH may be wanted for use in any particular descaling operation), this anolyte is drawn off, evaporated to the desired concentration, and delivered to the storage tank 16 of FIG. 1 for reuse in the descaling process, just as previously described for the treatment of the sodium citrate solution withdrawn from the center compartment of cell 8.

The electrodes of cell 20 may be provided with internal cooling means, and the entire cell, if desired, may also be provided with external cooling means to keep it at whatever temperature is most advantageous for any particular operation. As in the case of cell 8, the temperature is not very critical, and a wide range is permissible. Temperatures between about 60° F. and 180° F. are usually most satisfactory for operating with both kinds of cells.

As previously noted, the three-compartment cell 8 is preferred to the two-compartment cell 20 for use in the electrolyte step of our process. With cell 8 operated as previously described, there is less risk of losing any significant amount of citric acid by electrolytic oxidation. Nevertheless, the two-compartment cell 20, when operated with due care as above described, can also be used effectively for carrying out the electrolyte step of our process, as illustrated by the following example:

A laboratory size model of the two-chamber cell 20 provided with a graphite anode 22, a cation exchange membrane 21, and a Monel metal cathode 23, was used in the following test. Each of the electrodes 22 and 23 was provided with internal cooling means. The anode chamber was filled with 96 ml. of an aqueous 28% solution of sodium citrate having a pH of 13, which was used as the anolyte. It corresponded in all respects to the sodium citrate filtrate above described as being withdrawn from the sodium citrate filtrate tank 5 of FIG. 1 for use as both the anolyte and the citrate solutions to be recovered when using the two-chamber cell 20 in the electrolyte step of our process.

The cathode chamber was filled with 98 ml. of an aqueous 1 N solution of NaOH, which was used as the catholyte. The cell was operated with a constant DC electric current of 4 amperes, which corresponded to a current density of about 100 amperes per square foot. The initial voltage required to initiate this current was 7.8 volts, and it was decreased during the run as required to maintain the 4 ampere current constant. The temperature throughout the run was about 64° F. During the electrolysis, the pH of the anolyte continuously decreased and a corresponding quantity of NaOH was added to the catholyte. At the end of 2½ hours the pH of the sodium citrate anolyte solution had been reduced from 13 to 4 and the electrolysis step thus completed.

For large scale plant operations, a stack of two-chamber cells 20 of the FIG. 3 type can be arranged and connected in substantially the same way that has been described above for arranging a stack of three-chamber cells 8 of the FIG. 2 type.

The electrolytic step of our process may also be practiced in either a three-chamber cell of the FIG. 2 type or a two-chamber cell of the FIG. 3 type by making use of the following modification of the procedure previously described for practicing that step. The modified procedure is the same in all respects as that previously described except for the following differences: At the start of the electrolytic step, a sodium citrate solution having the pH desired for the reclaimed solution (for example, a pH of about 4) is put in the central chamber of cell 8 of FIG. 3 (or in the anode chamber of cell 20 of FIG. 2) instead of the basic sodium citrate solution from tank 5 of FIG. 1, as previously described, and throughout the electrolysis said basic sodium citrate solution from the storage tank 5 of FIG. 1 is fed to and mingled with the sodium citrate solution under treatment in the cell at such rate as to maintain the pH of the sodium citrate solution under treatment in the cell at that desired for the reclaimed solution (e.g., about pH 4) in spite of the continuous migration of sodium ions to the catholyte during electrolysis; also during the electrolysis some of the sodium citrate solution having the pH desired for the reclaimed solution is fed from said cell 8, or cell 20, to the evaporator for reclaimed solution indicated at 15 in FIG. 1 at such a rate as to maintain the volume of the sodium citrate solution having the desired pH in cell 8, or cell 20, about constant. When using this modification, the chemical reactions, products and byproducts of our process are the same as previously described, and, except as noted above, so too are all the procedures used in our process.

It will be obvious from the foregoing to those skilled in the art that various modifications of the procedure above described can be made without departing from the spirit and scope of our invention. For instance, spent solutions of alkali metal citrates other than sodium can be treated in like manner by substituting the other alkali metal for sodium. But, because of the relative cheapness of sodium as compared to other alkali metals, there will rarely, if ever, be occasion to do so. It is also obvious that by our process it is possible to continue the pH reducing step further and recover citric acid substantially free from alkali metal if such a product should be wanted.

In the appended claims, the phrase "spent aqueous sodium citrate solution" is intended to include any such solution which has been used for removing surface scale, film or other surface contamination from the surface of products made of iron, steel, stainless steel, or other alloy steel, or other metals, and in so doing has complexed enough metal to materially reduce its original complexing efficiency for iron and/or other metals (e.g., chromium or nickel) that it is desired to complex.

Commercial spent sodium citrate solution may often contain relatively small amounts of additives such as surfactants, corrosion inhibitors, etc. If present, such additives do not interfere with our recovery process, and, if any losses of such additives occur during our recovery process, the amounts lost may be replaced by adding them to the reclaimed solution in storage tank 16 of FIG. 1.

What we claim as our invention is:

1. A cyclic process for reclaiming spent aqueous alkali metal salt solution of a carboxylic acid, which comprises the following steps: (1) withdrawing the spent solution from the operation in which it became spent and mixing with it aqueous alkali metal hydroxide solution until the pH of the mixture becomes high enough to precipitate from the mixture substantially all of the metal that was complexed by the spent solution; (2) separating the precipitated solids, washing them with water, separating them from the wash water and recovering the separated solids thereby obtaining a byproduct consisting mostly of hydroxides of the metals that were complexed in the spent solution; (3) collecting and mingling the liquid and wash water from which the solids were separated thereby obtaining a somewhat diluted aqueous solution of a basic pH consisting of alkali metal carboxylate with excess alkali metal hydroxide; (4) subjecting the solution obtained in step (3) to electrolytic treatment in an electrolytic cell of the kind which has an anode and a cathode located in chambers separated by at least one cation exchange membrane to permit passage of positive ions and inhibit passage of negative ions, using an aqueous alkali metal hydroxide solution as the catholyte in said cathode chamber and alkali metal carboxylate solution in the chamber on the opposite side from the catholyte of the same cation exchange membrane; (5) passing a DC electric current through said cell and thereby (a) causing oxygen gas to be formed and released at the anode and hydrogen gas to be formed and released at the cathode, (b) causing positively charged alkali metal ions from said alkali metal carboxylate solution to migrate to the catholyte and unite with hydroxyl ions formed therein to generate additional alkali metal hydroxide in the catholyte, and (c) electrolyzing water to provide the positively charged hydrogen ions and negatively charged hydroxyl ions involved in said reactions as well as said oxygen and hydrogen gas; (6) replacing the water lost by electrolysis as needed to assist in maintaining the volume and concentration of the solutions in the cell; (7) continually withdrawing some of the catholyte solution and replacing it with water as needed to assist in maintaining the volume and concentration of the catholyte solution; (8) evaporating water from the withdrawn catholyte solution to obtain an alkali metal hydroxide solution of the desired concentration for reuse in step (1) of the process; and (9) withdrawing alkali metal carboxylate solution of the pH desired for the reclaimed solution and evaporating water from it to produce a reclaimed solution having both the pH and percentage concentration of alkali metal carboxylate desired for reuse in the operation from which the spent solution came.

2. Process according to claim 1 in which the alkali metal carboxylate solution obtained from step (3) used in the electrolytic cell at the start of the electrolysis has a pH of about 12 to 14 and the process is continued until the pH of the alkali metal carboxylate solution in the cell has the acid pH desired for the reclaimed solution before the alkali metal carboxylate solution is withdrawn from the cell.

3. A process in accordance with claim 1 in which the electrolytic cell is of the type having three chambers separated from each other by cation exchange membranes, and a sulfuric acid solution is used in the anode chamber to function as the anolyte and the alkali metal carboxylate solution under treatment is put in the central chamber of the cell between the anolyte and the catholyte compartments.

4. A process in accordance with claim 1 in which the electrolytic cell is of the type having two chambers separated from each other by a cation exchange membrane and the alkali metal carboxylate solution under treatment is in the anode compartment and functions as the anolyte during electrolytic treatment.

5. A process according to claim 1 in which any ingredient or proportion of any ingredient that may be desired for use in the operation from which the spent solution came, and that is not present in the reclaimed alkali metal carboxylate solution referred to in step (9), is added to the said reclaimed solution before recycling it in said operation.

6. A process according to claim 1 in which the pH of the mixtures referred to in steps (1) and (3) is about 12 to 14.

7. A process according ot claim 1 in which the temperature during the electrolytic step is kept between about 60° and 180° F.

8. A process according to claim 1 in which the current density during the electrolytic step is kept between about 40 and 120 amperes per square foot.

9. Process according to claim 1 in which the alkali metal hydroxide is sodium hydroxide and the alkali metal carboxylate is sodium citrate.

10. Process according to claim 9 in which the sodium citrate solution put in the electrolytic cell at the start of the electrolysis has about the pH desired for the reclaimed solution, and during the electrolysis the sodium citrate solution from step (3) having a pH of about 12 to 14 is fed into the sodium citrate solution under treatment in the cell at such rate as to maintain the solution under treatment in the cell at about the pH desired for the reclaimed solution, and continuously withdrawing some of this sodium citrate solution of desired pH from the cell during the electrolysis for use in making reclaimed solution at a rate to maintain the volume of sodium citrate solution under treatment in the cell.

11. A process according to claim 9 in which the pH desired and obtained for the reclaimed sodium citrate solution is about 3.5 to 4.5.

12. A process according to claim 9 in which the aqueous sodium hydroxide solution used as the catholyte is about 0.1 to 1.0 normal aqueous sodium hydroxide solution.

13. A process according to claim 9 in which the concentration of the sodium hydroxide solution used in step (1) and that reclaimed in step (8) and recycled for use in step (1) is about a 50% solution.

14. In a process for recovering spent alkali metal citrate solution, the step of converting an alkali metal citrate solution of basic pH to an alkali metal citrate solution of whatever acid pH is desired by (1) subjecting said basic citrate solution to electrolytic treatment in an electrolytic cell of the kind which has an anode and cathode located in separate chambers separated by at least one cation exchange membrane to permit passage of positive ions and inhibit passage of negative ions; (2) using an aqueous solution of the hydroxide of said alkali metal as the catholyte in said cathode chamber and alkali metal citrate solution in the chamber on the opposite side from the catholyte of the same cation exchange membrane; (3) passing direct electric current through said cell whereby (a) water is electrolyzed releasing oxygen gas at the anode and hydrogen gas at the cathode, (b) alkali metal ions are caused to migrate into the catholyte and be replaced in the alkali metal citrate solution by hydrogen ions generated therein, and (c) the alkali metal ions migrating to the catholyte form with hydroxyl ions generated therein additional alkali metal hydroxide in the catholyte solution; (4) replacing the water lost by electrolysis as needed to assist in maintaining the volume and concentration of the solutions in the cell at a suitable level; (5) withdrawing alkali metal hydroxide solution from the cathode chamber and replacing it with water as needed to assist in maintaining the volume and concentration of the catholyte solution at a suitable level; and (6) withdrawing alkali metal citrate solution of the desired acid pH from the cell.

15. A process in accordance with claim 14 in which the alkali metal citrate solution put in the cell at the start of the electrolysis has approximately the ultimate acid pH desired and during the electrolysis is maintained at the desired pH by continuous addition of the basic alkali metal nitrate solution to be treated at a rate to compensate for the loss and the replacement by hydrogen ions of the alkali metal ions migrating to the catholyte during the electrolysis, and continuously withdrawing alkali metal citrate solution of the desired acid pH from the solution at a rate to maintain the volume of such solution in the cell at a suitable level.

16. A process in accordance with claim 14 in which the alkali metal is sodium.

17. A process in accordance with claim 14 in which the alkali metal citrate solution used in the cell at the start of the electrolysis has a basic pH and the process is continued until the solution has the desired acid pH before the alkali metal citrate under treatment is withdrawn from the cell.

18. A process in accordance with claim 17 in which the electrolytic cell is of the type having three chambers separated from each other by cation exchange membranes, and a sulfuric acid solution is used in the anode chamber to function as the anolyte and the sodium citrate solution under treatment is put in the central chamber of the cell between the anolyte and the catholyte compartments.

References Cited

UNITED STATES PATENTS 2,921,005  1/1960  Bodamer.
3,033,214  5/1962  Bersworth et al. _____ 134—13

HOWARD S. WILLIAMS, *Primary Examiner.*

D. R. JORDAN, *Assistant Examiner.*

UNITED STATES PATENT OFFICE
CERTIFICATE OF CORRECTION

Patent No. 3,411,998                        November 19, 1968

Harold Wallman et al.

It is certified that error appears in the above identified patent and that said Letters Patent are hereby corrected as shown below:

Column 1, line 54, "if" should read -- is --. Column 2, line 32, "into" should read -- in --. Column 4, line 7, "though" should read -- through --; line 55, after "a" insert -- multiple-effect evaporator, shown at 14 in the flow sheet --. Column 6, line 1, "cathalyte" should read -- catholyte --. Column 10, line 10, "mitrate" should read -- citrate --.

Signed and sealed this 10th day of March 1970.

(SEAL)
Attest:

Edward M. Fletcher, Jr.                  WILLIAM E. SCHUYLER, JR.
Attesting Officer                          Commissioner of Patents